United States Patent [19]

Alard

[11] Patent Number: 4,707,730
[45] Date of Patent: Nov. 17, 1987

[54] SYNC EXTRACTION FOR A BROADCASTING SYSTEM WITH TIME MULTIPLEXING OF DIGITAL AND ANALOG SIGNALS

[75] Inventor: Michel Alard, Rennes, France

[73] Assignees: Etat Francais représenté par le secrétaire d'Etat Aux Postes et Télécommunications et á la Télédiffusion (Centre National d'Etudes des Telecommunications); Etablissement Public de Diffusion dit"Telediffusion de France", both of France

[21] Appl. No.: 739,718

[22] Filed: May 31, 1985

[30] Foreign Application Priority Data

Jun. 4, 1984 [FR] France .................. 84 08728

[51] Int. Cl.$^4$ .................................. H04N 11/06
[52] U.S. Cl. ........................ 358/13; 358/153; 375/98; 375/111; 455/237; 455/246
[58] Field of Search ............ 358/13, 12, 141, 153, 358/17; 375/97, 98, 106, 111, 76; 307/555, 560; 330/278, 279; 455/234, 237, 245, 246, 247

[56] References Cited

U.S. PATENT DOCUMENTS

| | | |
|---|---|---|
| 3,409,834 | 11/1968 | Cullis et al. ............ 455/247 X |
| 3,851,266 | 11/1974 | Conway ................. 375/106 X |
| 3,914,536 | 10/1975 | Mohri et al. ............. 358/153 |
| 4,360,929 | 11/1982 | Isobe .................... 375/98 X |
| 4,517,586 | 5/1985 | Balaban et al. ............ 358/13 |
| 4,540,974 | 9/1985 | Schanne et al. ......... 358/13 X |
| 4,602,374 | 7/1986 | Nakamura et al. ....... 375/76 X |

OTHER PUBLICATIONS

"Multiple Sound Channels in Satellite Broadcasting"; Windram; IEEE Proceedings, vol. 129, PEA, #7, Sep. 1982, pp. 528–531.

Primary Examiner—James J. Groody
Assistant Examiner—Victor R. Kostak
Attorney, Agent, or Firm—Larson and Taylor

[57] ABSTRACT

In a broadcasting system with time division multiplexing of digital signals containing a synchronization pattern and analog signals, sync extraction is achieved with a process including detecting the extreme values of the signals to be subjected to decoding, after they have been amplified with a gain G, with a time constant compatible with the low cut off frequencies to be accomodated; the gain G is controlled as a decreasing function of the difference between the extreme values with a time constant greater by several orders of size than the repetition period of the multiplex; before decoding and determination of the extreme values, there is added to the amplified signal a DC component which is a decreasing function of the sum of the extreme values, until the retrieval of the clock signal and identification of the synchronization pattern downstream of the coding.

8 Claims, 7 Drawing Figures

$s_1$ —
$s_2$ —

0,8 V

SYNC EXTRACTION FOR A BROADCASTING SYSTEM WITH TIME MULTIPLEXING OF DIGITAL AND ANALOG SIGNALS

TECHNICAL FIELD OF THE INVENTION

The invention relates to broadcasting systems of the type using time multiplexing of digital signals, which ensure the overall synchronization, and analog signals. It finds a particularly important application in television broadcasting systems with time multiplexing of analog image signals and digital sound and data signals transmitted in the form of bursts during the line blanking intervals.

BACKGROUND OF THE INVENTION

Extraction of the synchronisation raises in fact in this case a problem which is not met with when the video signal is composite (SECAM, PAL or NTSC for example) and when the line synchronisation is provided by pulses placed in each blanking interval (line and frame) and using levels forbidden to the luminance signal. Recognition of the signals is then simple.

Synchronisation is also simple when the signal is purely digital and when the data transmitted has a statistical independence which may be intrinsic or obtained artificially by mixing (modulo 2 addition of a pseudorandom sequence). The transitions are then in fact in a number sufficient for retrieval of the clock and for estimating the amplitude and the average value of the signal, so adjusting the decoding threshold (or thresholds) of the data and, consequently, retrieving the synchronisation patterns.

It is not at all the same in the case of a base band time multiplex comprising an image signal which, because it is redundant by nature and has a very variable mean value, breaks the statistical independence and prohibits the use of fixed thresholds chosen once and for all with respect to the original signal.

The problem is particularly acute in the case of a multiplex where the extreme levels of the data signal do not exceed the analog level, which makes it impossible to detect the digital signals and in which the analog signals have considerable power at the clock frequency of the digital signals. This latter situation is met with more especially when the television multiplex associates a duobinary coded data signal with component analog multiplexing (or MAC). The flowrate of the binary elements of the digital signal is 10.125 Mbits/s and corresponds to a spectral band in which the time compressed analog signal has appreciable energy.

The field of application contemplated by the invention concerns the system known under the name of "D2-MAC-PAQUETS". This system, which associates in the same base band signal a MAC type signal and data at 10.125 Mb/s coded in duobinary form is derived from the C-MAC/PACKET system proposed by F.R.U. for satellite broadcasting. However, the D2-MAC-PACKET system applies also to broadcasting over land carriers not offering the bandwidth B = 27 MHz required for direct satellite television in the 12 GHz band. It allows in particular broadcasting in 7 or 8 MHz channels using vestigial side band amplitude modulation.

SUMMARY OF THE INVENTION

It is an object of the invention to achieve rapid acquisition of the synchronisation, then conservation thereof in broadcasting systems of the above-defined type. It is an ancillary object to allow the digital signal to be demodulated even in the presence of considerable low frequency distorsions, low frequency cut off, addition of noise or a sine shape signal at the mains frequency (50 HZ or 60 Hz) and superimposition of a DC voltage.

To this end, the invention provides a synchronisation extraction process for a broadcasting system with time multiplexing of digital signals containing a synchronisation pattern and analog signals, characterized in that the extreme values are detected of the signals to be subjected to decoding, previously amplified with a gain G, with a time constant compatible with the low cut off frequencies to be accomodated; in that the gain G is controlled as a decreasing function of the difference between the extreme values with a time constant greater by several orders of size than the repetition period of the multiplex; in that (before decoding and determination of the extreme values) there is added to the amplified signal a DC component which is a decreasing function of the sum of the extreme values, until the retrieval of the clock signal then identification of the synchronisation pattern downstream of the coding.

Once this acquisition phase accomplished, the synchronisation may be held by substituting a control by difference between the white and black levels for the control as a function of the difference between the extreme values and by substituting a control by a clamping signal included in each line in the multiplex for the control as a function of the sum of the extreme values.

The different controls must obviously be effected with an appropriate time constant, which may be obtained by introducing an integration into the elaboration of the signal controlling the gain and the value added to the amplified signal.

In its application to synchronisation extraction for a 625 line television system with time multiplexing of duobinary coded digital containing the synchronisation patterns, and of time compressed luminance and chrominance analog signals, the ratio between the amplitude of the digital signals and that of the analog signals being between 80% and 100%, a time constant may be used during the acquisition phase between 100 ms and is for controlling the gain; for elaborating the DC level added to the signal, a time constant may be used approximately equal to the duration of a line during acquisition, from 1 to 5 μs during holding.

The invention also provides a device for implementing the above defined process.

The invention will be better understood from reading the following description of a particular embodiment given by way of non limitative example.

SHORT DESCRIPTION OF THE DRAWINGS

FIG. 1 shows the structure of a 64 μs television line of a so-called "D2-MAC-PACKET" system, FIG. 2 is the diagram of the eye of the signal of FIG. 1, FIG. 3 is a duobinary decoder diagram, FIG. 4 is a block diagram showing a possible construction of the synchronisation extraction device, FIG. 5 is a diagram showing a possible construction of a peak detector usable in the device of FIG. 4, FIG. 6 is a diagram showing the mode of intervention of the peak detectors and of the device in the presence of a low frequency break, FIG. 7 is a general diagram of a variant of a fragment of FIG. 4.

DETAILED DESCRIPTION OF AN EMBODIMENT

Figure 1:
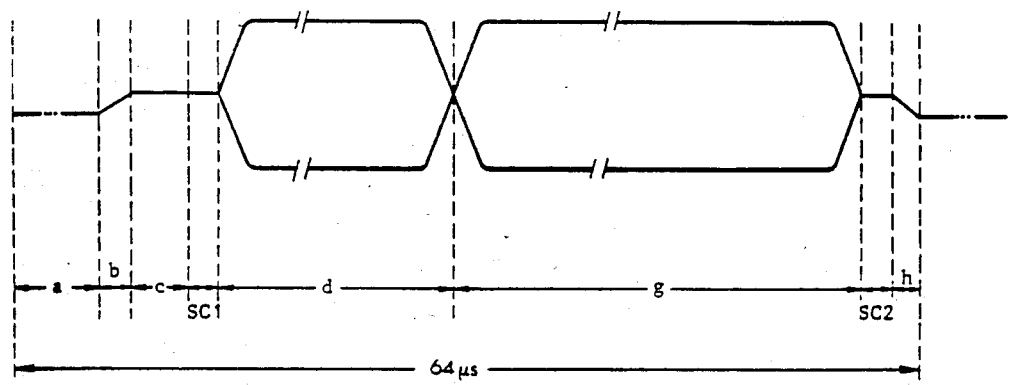
Figure 2:
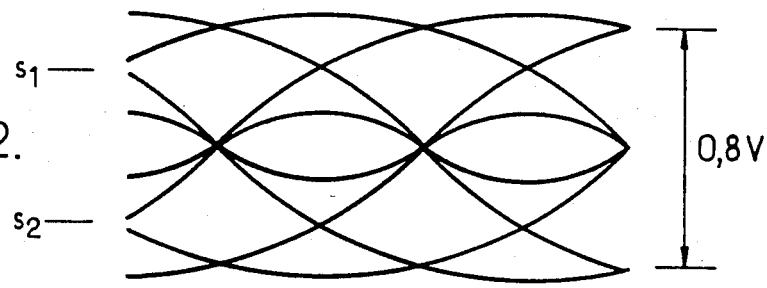

The invention will be described in its application to a television system using a form of signal of the kind shown in FIG. 1 for a scanning line, whose successive intervals a to h are assigned in the following way:

a:data period (106 bits sent at an instantaneous flow-rate of 10.125 Mbits/s) occupied by a starting bit, a 7 bit line synchronisation word, then about 100 data bits properly speaking, possibly comprising sound information, service, text channels. The data is duobinary coded, i.e. in a three level code having forbidden transitions, the diagram of the eye of which is shown in FIG. 2. Decoding of the duobinary signal into base band (at the output of a high frequency demodulator which will be provided in the receiver) is accomplished simply by means of a circuit 30 which may be the one shown in FIG. 3, comprising two comparators 32 and an "EXCLUSIVE OR" gate 34.

b:transition between the data signal and the clamping period, c:clamping period, providing an alignment level, sc1:image encryption or scrambling;

d:colour difference (354 clock periods);

e:luminance (307 clock periods), sc2:image encryption or scrambling;

h:transition between the image signal and the data signal.

The whole of the line represents 1296 clock periods. Each frame comprises in addition reference levels emitted during the 624th line, i.e. at the level of the frame. The levels will be black and white levels. Each frame also comprises, during the 625th line, a frame synchronisation word much longer than the line synchronisation word (64 bits instead of 7 bits) so as to ensure a practically absolute certainty of recognizing the synchronisation at the first identification.

This construction is similar to that of the C-MAC PACKET System, a description of which may be found in the article "Systéme C-MAC/PAQUETS pour la téléevision directe par satellite" (Revue de l'U.E.R.—Technique N° 220 Aug. 1983).

With the amplitude of the data signal between 80% and 100% that of the image signal, it is not possible to differentiate the data signal so as to evaluate the amplitude and the mean value thereof and to adjust the detection thresholds accordingly with respect to the signals. It should be noted in passing that this adjustment may be effected either by adjusting the thresholds or by adjusting the amplification of the received signal and an offset voltage which is added thereto. As a general rule it is the second solution which will be chosen and it will be considered hereafter.

To overcome the difficulty, the process of the invention uses two successive phases, which will be qualified as acquisition phase and holding phase.

Figure 3:
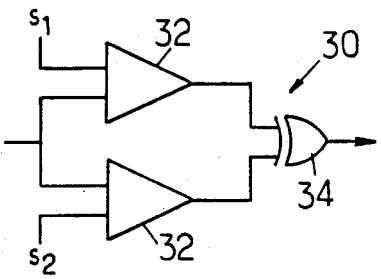

During the acquisition phase it will be necessary to estimate the amplitude and the mean value of the data signal from the whole of the signals, which allows the position of the decoding threshold (or thresholds, when two decoding thresholds are required, which is the case in duobinary coding) to be adjusted approximately with respect to the signal. This adjustment will be carried out by correcting the amplification of the signal and adding a shift voltage so as to position it approximately with respect to the fixed decoding thresholds S1 and S2 (FIG. 3). The clock signal may then be retrieved, then the synchronisation pattern extracted.

At the end of the acquisition phase, a time base is available and then, during the holding phase, the signal can be aligned from the reference level transmitted once per line (clamping level) and its amplitude can be regulated in accordance with the black and white levels transmitted at each frame.

During the holding phase, fine regulation of the signal is therefore carried out.

Figure 4:
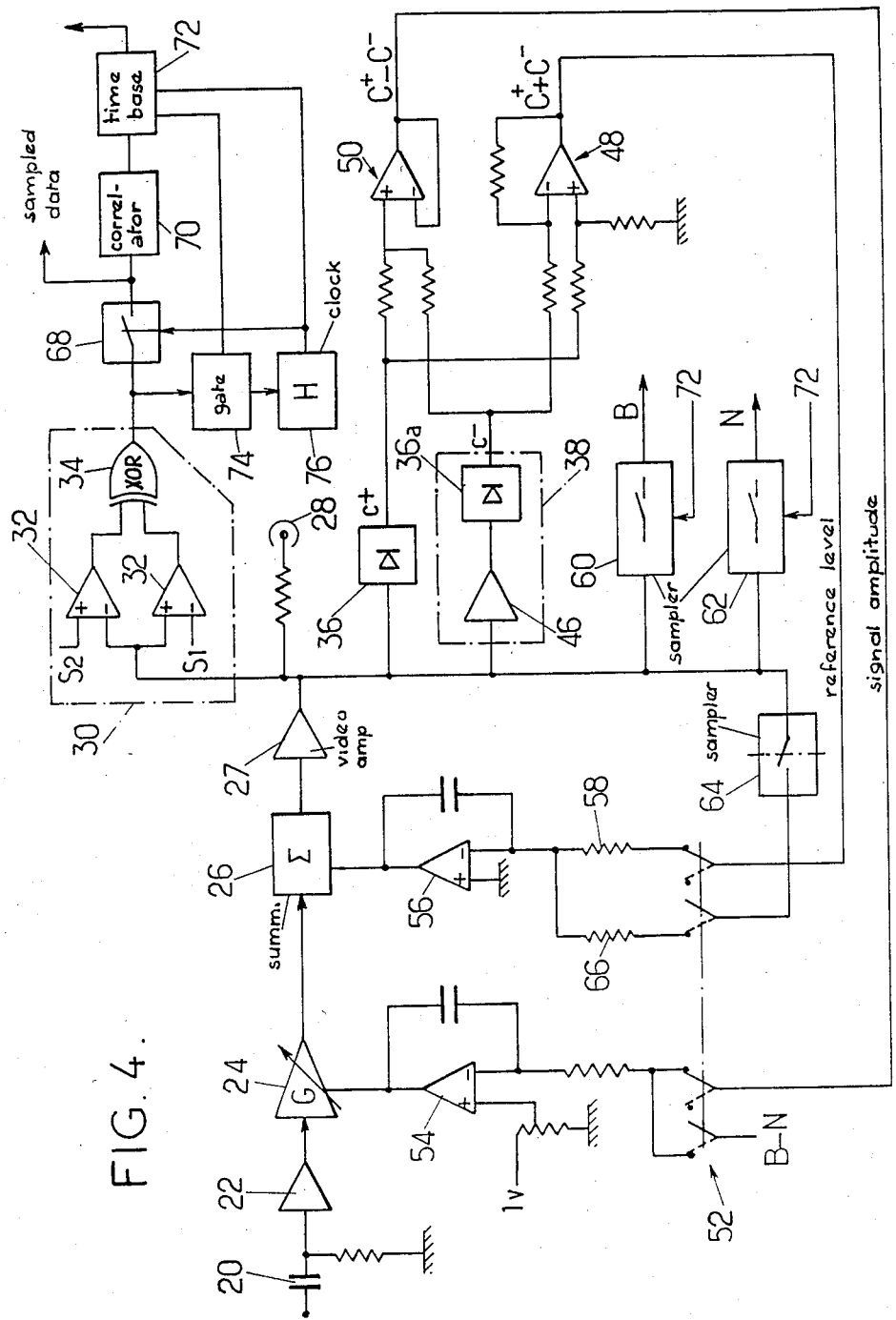

The device shown in FIG. 4 allows the above functions to be accomplished. The device receives the signal through a capacitor 20 provided for suppressing a possible DC component. The capacitor is followed by a buffer amplifier 22 with high input impedance, then an amplifier 24 with variable gain G allowing the amplitude of the signal to be regulated in a range which may be generally from ±6 dB. The amplifier 24 is followed by a summator 26 associated with a video amplifier 27 and allowing a correction voltage to be juxtaposed with the signal of the amplifier 24.

Figure 5:
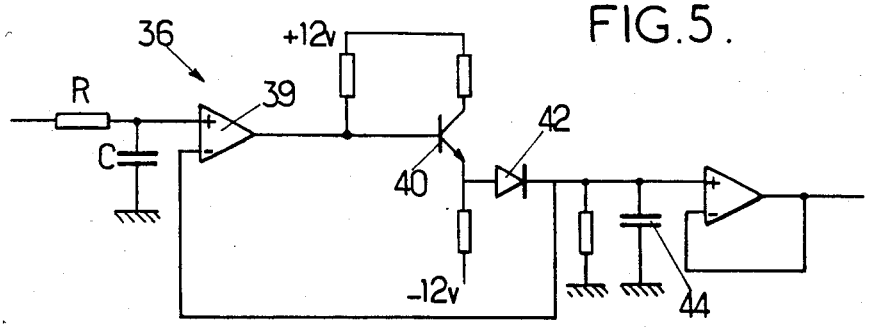

The amplifier 27 feeds several channels. One is formed by a video output 28. A second channel is formed by the circuits supplying sampled data. It comprises the decoder 30 formed from two comparators 32 with thresholds S1 and S2 followed by an EXCLUSIVE OR gate 34. This decoder supplies clock retrieval and data sampling components which will be described further on. A channel for regulating and aligning the signal comprises, in parallel, a positive peak detector 36 and a negative peak detector 38. Detector 36 may be formed as shown in FIG. 5. This detector 36 comprises an input RC filter having a time constant of the order of 100 ns for eliminating a part of the noise and suppressing the excessive oscillations of the data signal. The time constant is chosen so that the peak detector 36 reaches the maximum signal level of duobinary coded data (i.e. the positive peaks) corresponding to a succession of "1s". It comprises an operational amplifier 39 whose positive input is connected to the output of the RC circuit. This operational amplifier is followed by a transistor 40 and a rectifier 42. The downstream of rectifier 42 is relooped to the inverting input of the operational amplifier 39. A storage capacitor 44 stores the peak value. It has a value such that the discharge time constant is of the order of 3 ms. This choice is the result of a compromise: it allows the cuts to be accommodated up to a frequency of the order of 50 Hz without impairing the accuracy of the thresholds during the acquisition phase, as would be the case with a smaller time constant.

The negative peak detector 38 comprises a positive peak detector 36a identical to detector 36, preceded by an inverter 46.

The peak detectors 36 and 38 feed two circuits one of which works out the sum and the other the difference of the extreme values of the signals. Each one may be formed, as shown in FIG. 4, by an operational amplifier 48 or 50 looped appropriately.

The difference C+ −C− gives the amplitude of the output signal, the sum C+ +C− gives an estimation of the reference level of the line.

A battery of switches 52 which may be formed by MOS technology, provides during the acquisition phase the connection illustrated by continuous lines in FIG. 4. In this state of the switches 52, the difference of the signals C+ −C− is applied to one of the inputs of an operational amplifier 54 connected as an integrator and it is compared with a reference voltage (+1V for example). The output of the integrator 54 controls the gain G of the variable gain amplifier 24. The time constant of the control loop of amplifier 24 thus formed may be chosen, depending on the desired response speed, between 100 ms and 1 s. A value of about 600 ms will generally be appropriate.

In the illustrated embodiment, the sum of the signals is applied to a second operational amplifier 56 connected as an integrator, which supplies the level to be added to the signal in the summator 26. The resistor 58 of the RC integration network is chosen so that the integration time constant has a duration approximately equal to that of a line, i.e. 64 μs. As will be seen further on, this value is optimum, for it allows the error signal to be cancelled within a line. More generally, if a different value τ of the time constant were adopted, the error signal supplied would follow the geometrical progression of law 1-64/τ. This formula shows that a value below 32 μs cannot be adopted for there would be a divergence of the series of values of the error signal.

The amplifier 27 further supplies two channels formed by samplers 60 and 62 intended to supply a white reference B and a black reference N. These samplers, the control of which will be described further on, supply, through short duration storage elements, a subtractor (not shown but which may be similar to subtractor 48) whose output is connected to a switch for connection with the integrator 54 during the holding phase (junctions indicated with broken lines in FIG. 4).

Finally, amplifier 27 supplies, through a clamping level sampler 64, a switch for connection with integrator 56 in the holding phase. The integration resistor 66, which replaces resistor 58, is chosen so as to give integrator 56 a relatively short time constant, typically of 1 to 5 μs.

Decoder 30 is connected to a circuit which ensures both clock retrieval and the supply of sampled digital data. For that, it comprises a first branch having a sampler 68 whose output supplies the sampled data, once the acquisition of synchronisation has been achieved. The output of the sampler is also connected to a correlator 70 for recovering the frame synchronisation pattern. Because of the length of this pattern, a single identification is sufficient (whereas in the case of the line synchronisation pattern, the acquisition would only be considered as achieved after several successive identifications). Finally, the output of the correlator is applied to a time base 72 for extracting the service signals and more particularly the switching commands.

The time base 72 is connected to an enabling input of a gate 74 of a clock retrieval circuit 76, which, in its turn, controls (once the holding conditions reached) sampler 68 and time base 72.

The operation of the circuit of FIG. 4 is as follows.

At the beginning of the acquisition phase, switches 52 are placed by the time base 72 in the state shown with continuous lines. The clock 76 operates as a free oscillator without phase relation with the arrival timing of the digital samples. Gate 74 is permanently open.

During each line, the peak detectors 36 and 38a supply the extreme values of the data signal. The difference between the extreme values is used for adjusting the gain G and the sum for approximately aligning the signal. Once this adjustment has been accomplished, decoding by 30 allows the correlator to identify the frame synchronisation or, by a conventional strategy of several successive recognitions, the line synchronisation. This recognition allows the time base 72 to be set which, in its turn, locks the retrieval device of clock 76 by closing gate 74 outside the arrival periods of the digital signal.

Once the signal has been approximately positioned with respect to thresholds S1 and S2 and the synchronisation retrieved, the time base 72 controls the switching of switches 52. For that, MOS switches can be used usually having a switching time of about 500 ns. At this stage, the integrators placed in the controls of 34 and 36 play an essential role, for they maintain the levels and prevent loss of the prepositioning achieved during the acquisition phase.

From this moment, the signals from the time base 72 control the samplers 60 and 62 supplying the white and black levels whose difference controls the gain G of amplifier 24, with the same time constant as during the control by C+ −C−. The alignment voltage applied to summator 76 is adjusted by clamping level sampling during closure of the sampler 64 during the period c (FIG. 1). The sampling period is brief, about 700 ns and requires the use of a rapid switching sampler 6. A bipole hybrid switch may be used having a switching time less than 50 ns, such as the model V will from CIT ALCATEL.

Figure 6:
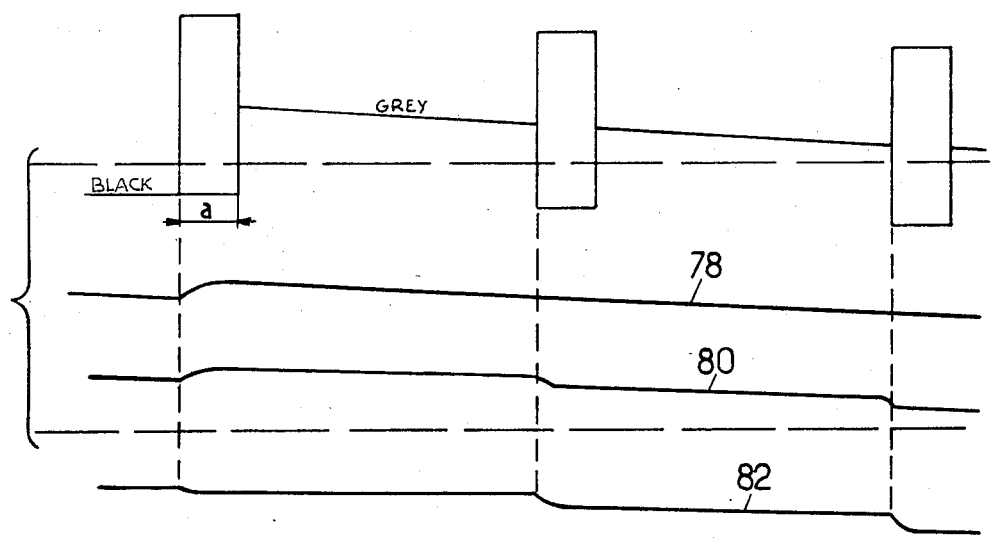

An example of action of the circuit in the case of low frequency cut-off is shown in FIG. 6 which corresponds to the case of the image signal of the permanent black passing to permanent grey from one frame to the next. The first line shows the form of the signal degraded by the sudden cut-off of the low frequencies; curves 78, 80 and 82 in the low part show respectively the positive peak, mean and negative peak values and show the progressive re-alignment by modification of the level applied to summator 26. It can be seen that the mean value 80 varies little during the line duration, the modifications taking place at the beginning of the data burst.

If we let $\epsilon n$ desgnate the error signal during the line of order n, $\epsilon n+1$ the signal during the next line and $\tau$ the time constant (in μs) of integrator 56, we have:

$$\epsilon n+1 = \epsilon n - \epsilon n (64/\tau)$$

which shows the optimum $\tau = 64 \mu s$

It can be seen that the differences due to variations of the analog level are thus accomodated in a line.

Figure 7:
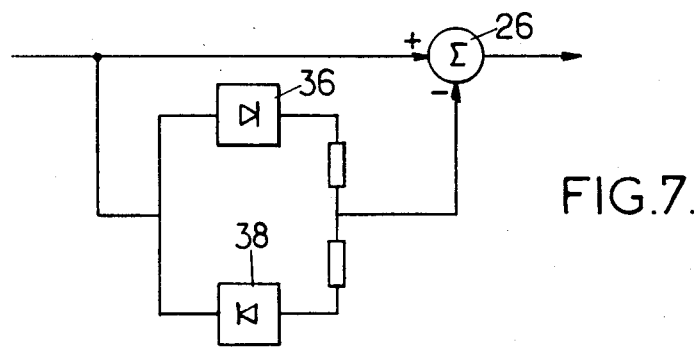

Variants of construction of the invention are obviously possible. In particular, the voltage applied to summator 26 may be controlled in an open loop by subtracting the voltage representative of the mean value (half sum of the extreme values) in the summator. The circuit is then the one shown in FIG. 7. But this configuration complicates the switching off of the peak detectors during the holding phase.

The device which has just been described has the additional advantage of allowing the signal to be centered in a reception filter, which is necessary when the signal is frequency modulated so as to allow demodulation thereof.

For that it is sufficient to omit the input stage with capacitor 20, so as to allow the DC component of the signal to pass and the discriminator to be connected directly to the amplifier 24. The correction voltage applied to summator 26 then gives an estimation of the off centering of the modulated signal with respect to the reception filter. To the extent that there is no shift between the center of the reception filter and the zero of the discriminator, this voltage may be used as control for an automatic frequency control circuit (AFC). This latter must simply have a sufficiently long time constant for there to be no low frequency oscillations due to the presence of two parallel regulation loops. The AFC circuit is automatically sampled by 64 as soon as the synchronisation has been recognised.

I claim:

1. A synchronisation extraction process for a broadcasting system with time division multiplexing of digital signals containing a synchronisation pattern and of analog signals constituting a multiplex, signel comprising the steps of: detecting the extreme values of the multiplex signal to be subjected to decoding, previously amplified with a gain G, with a first time constant compatible with the low cut-off frequencies to be accomodated; controlling the gain G responsive to the difference between the extreme values for decreasing the gain upon increase of said difference, with a second time constant greater by several orders of magnitude than the duration of a multiplex signal cycle; adding a DC component to the amplified signal which is a decreasing function of the sum of the extreme values, until retrieval of a clock signal from said digital signals and identification of the synchronisation pattern downstream of the decoding and decoding and determining said extreme values.

2. Process acording to claim 1 comprising, after synchronisation pattern identification, the further step holding the synchronisation by substituting a gain control signal therefor representative of the difference between the white and black levels for said gain control as a function of the difference between the extreme values; and by substituting control of said DC component by a clamping signal included in each line of the multiplex signal for said control of said DC component as a function of the sum of the extreme values.

3. Process according to claim 1, for a 625 line television system with a 20.25 MHz clock frequency, wherein said time division multiplexing provides said digital signals in binary coded form containing said synchronisation pattern at a rate of one per line and time compressed luminance and colour difference signals constituting said analog signals, between the amplitude of the digital signals, ratio between the ratio between the amplitude of the digital signals and that of the analog signals being of from 80% to 100%.

comprising the step of selecting said second time constant at a value of 100 ms to 1 s for controlling the gain and selecting a time constant at a value approximately equal to the duration of a line for generating said DC components added to the signal, until retrieval of the clock signal.

4. Process according to claim 3, using, during holding of the synchronisation, a time constant of 1 to 5 us for elaborating the component added to the signal.

5. A synchronisation extraction device for a broadcasting system with time multiplexing of digital signals containing a synchronisation pattern and analog image signals, constituting a multiplex signal, comprising in succession, along the path of the signals:

an amplifier with variable gain (G) connected to receive said multiplex signal and to deliver an amplified signal, a summing circuit for adding an adjustable DC level to said amplified signal and delivering an output signal, means for detecting the extreme values of said output signal of the summing circuit, means for controlling the gain (G) as a function of the difference between said extreme values, means for adjusting the DC level as a function of the sum of said extreme values, and means for decoding the output signal of the summing circuit and retrieving a clock signal and the synchronisation pattern from said digital signals.

6. Device according to claim 5 for television broadcasting system, further comprising: switching means for, in response to retrieval of the synchronisation pattern, rendering said means for controlling the gain (G) responsive to the difference between black and white levels in said analog signals and said means for adjusting the DC level responsive to a clamping level present in the multiplex.

7. Device according to claim 6, for a 625 line television system with a clock frequency of 20.25 MHz, wherein said digital signals are duobinary coded digital signals containing one synchronisation pattern per line and said analog image signals are time-compressed luminance and chrominance analog signals, the ratio between the amplitude of the digital signals and that of the analog signals being between 80% and 100%.

wherein said means for adjusting the DC level are arranged for presenting a time constant of the same order of magnitude as the duration of a line during control by the sum of the extreme levels, of from 1 to 5 $\mu$s during control by the clamping level.

8. Device according to claim 7, wherein the clamping level is provided by sampling means having a switching time or the order of 10 ns.

* * * * *